Feb. 7, 1928.

S. M. LUCAS 1,658,491

RAILWAY TRAFFIC CONTROLLING APPARATUS

Original Filed Dec. 20, 1926

INVENTOR:
S. M. Lucas,
by A. L. Vencill,
His Attorney.

Patented Feb. 7, 1928.

1,658,491

UNITED STATES PATENT OFFICE.

SAMUEL M. LUCAS, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Application filed December 20, 1926, Serial No. 155,881. Renewed December 28, 1927.

My invention relates to railway traffic controlling apparatus, and particularly to apparatus of the type wherein alternating train governing current is periodically applied to the track rails. More specifically, my present invention relates to apparatus of this type in which the track rails are provided with direct current track circuits including direct current relays. One feature of my invention is the provision of means for preventing false operation of a direct current track relay by surges of current due to the periodic application of the alternating train governing current.

I will describe several forms of apparatus embodying my invention, and will then point out the novel features thereof in claims.

Figure 1:
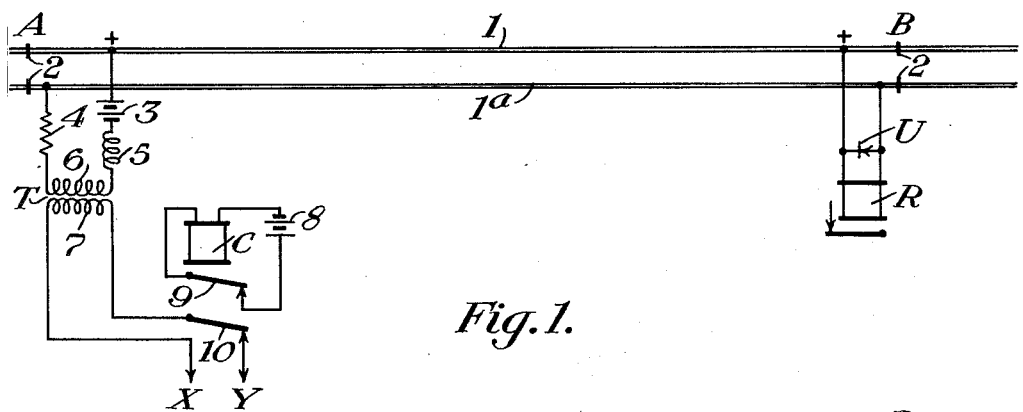
Figure 2:
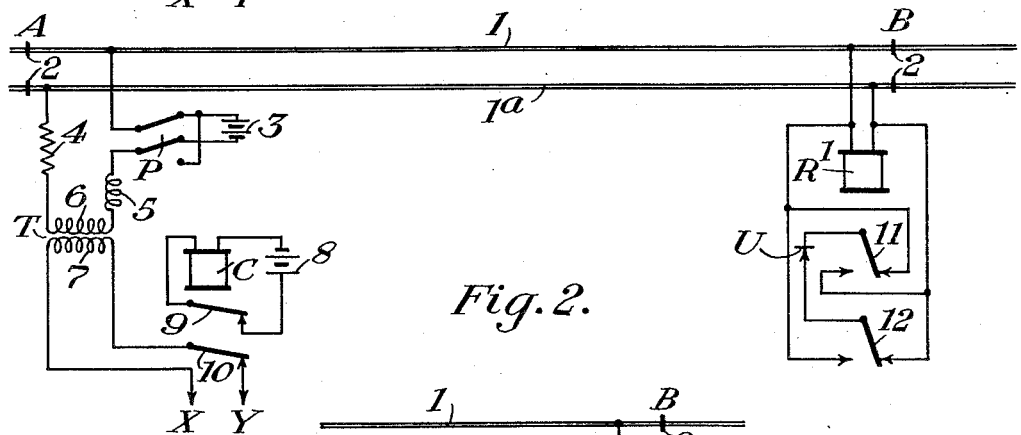
Figure 3:
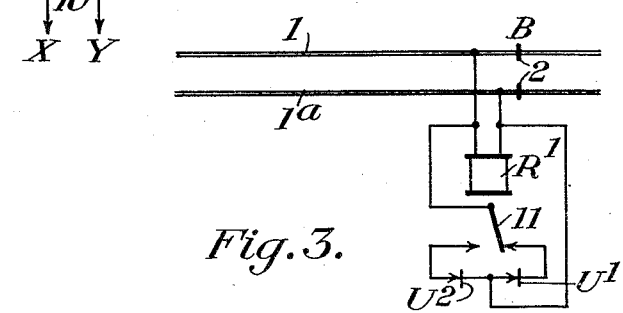
Figure 4:
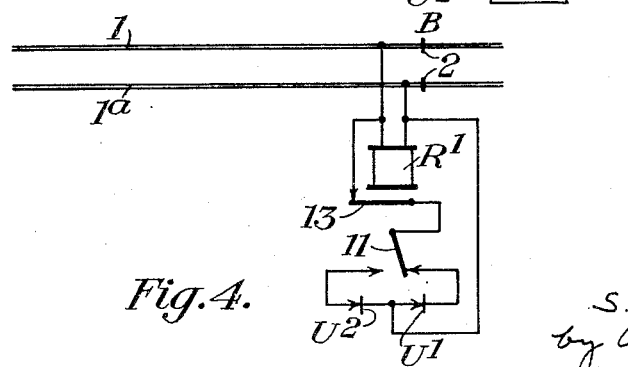

In the accompanying drawing, Fig. 1 is a diagrammatic view showing one form of apparatus embodying my invention as applied to a non-polarized direct current track circuit. Figs. 2, 3 and 4 are views showing modifications of the apparatus shown in Fig. 1 and adapted for polarized direct current track circuits.

Similar reference characters refer to similar parts in each of the several views.

Referring first to Fig. 1, the reference characters 1 and 1ª designate the track rails of a railway, which rails are divided by insulated joints 2 to form a track section A—B. This section is provided with a direct current track circuit comprising a battery 3 connected across the rails adjacent the point A and a direct current track relay R connected across the rails adjacent the point B.

Interposed between the battery 3 and the track rail 1ª is the secondary 6 of a transformer T, the primary 7 of which is at times supplied with alternating current from a source which is not shown in the drawing, but the terminals of which are designated by the reference characters X and Y. The primary circuit for transformer T includes a back contact 10 of a coding relay C provided with an operating circuit comprising a battery 8 and a back contact 9. It follows that, as illustrated in the drawing, the relay C will operate continuously to periodically open and close its back contacts. It will be seen from the foregoing that while relay C is in operation contact 10 will be periodically closed and opened, so that alternating current will be periodically supplied to the transformer T and so to the track rails 1 and 1ª.

Preferably a non-inductive resistance 4 and an inductive reactance 5 are included in the connection across the track rails at the point A.

When an alternating potential is impressed on an inductive circuit, if the contact is made at or near the instant the voltage wave is passing through zero, a surge of current will be set up in the circuit, which surge is composed of the alternating current wave plus a transient direct current component, and this direct current component will be either positive or negative, depending upon whether the alternating current wave is moving toward the positive maximum or the negative maximum at the instant the contact is made. With the apparatus shown in Fig. 1, the instant at which the contact 10 is closed by the coding relay C bears no definite time relation to the alternating current wave which is being coded, and hence this contact will sometimes be closed at such an instant as to set up a surge having a direct current component. If the direct current component of the surge is in the same direction as the direct current operating the track relay R, the armature of this relay will momentarily be more firmly drawn against the core, but if the direct current component of the surge is opposite in polarity to the direct current supplied to the relay from battery 3, the pull on the relay armature will be momentarily diminished and this armature may be momentarily released. The result of this may be that the armature will open and close in an irregular manner, and this operation of the armature may be of sufficient magnitude to open and close the relay contacts.

In order to prevent this undesirable operation of the relay armature, I connect an asymmetric unit U in multiple with track relay R in such direction that the unit shunts away from the relay the half waves of the direct current components referred to above which are opposite in polarity to the direct current supplied to the relay R by the battery 3. The unit U will not conduct the current supplied by battery 3, and hence it does not interfere with the proper operation of track relay R by this battery, but it does conduct the surges which would tend to interfere with the proper operation of the relay. My invention has the further advantage that even if the alternating current wave train arrives at the track relay without causing a surge tending to open the relay, the asymmetric unit U will conduct the half of each wave which opposes the normal operation of the relay, and the other half of each wave supplements the battery current in the track relay. The increase of power thus supplied to the track relay is not objectionable, because any action which interrupts the direct current, such as a train shunt, or contacts in the track circuit, will also interrupt the alternating current.

Referring now to Fig. 2, the apparatus shown in this view is similar to that shown in Fig. 1, except that the battery 3 is reversibly connected across the track rails by a pole-changer P, and the track relay, which is here designated $R^1$, is of the polarized type which responds to reversals of the connection of battery 3. The asymmetric unit U is connected in multiple with the relay $R^1$ through the medium of polar contacts 11 and 12 of this relay in such manner that this unit always shunts away from the relay current which is opposite in polarity to the direct current supplied to the relay from battery 3. As illustrated in Fig. 2, the positive terminal of battery 3 is connected with the upper rail 1, and the unit U is so connected that it will conduct current flowing from rail $1^a$ to rail 1, but not current flowing from rail 1 to rail $1^a$. When pole-changer P is reversed, the positive terminal of battery 3 will be connected with rail $1^a$, and polar contacts 11 and 12 of relay $R^1$ will also be reversed so that unit U will then be connected in such manner that it will conduct current flowing from rail 1 to rail $1^a$ but not current flowing from rail $1^a$ to rail 1.

Referring now to Fig. 3, I have here shown two asymmetric units $U^1$ and $U^2$ controlled by a single polar contact 11 of relay $R^1$ in such manner that one of these units or the other is connected in multiple with the winding of the relay $R^1$ according as this relay is energized in one direction or the other. When the upper rail 1 is positive, the unit $U^1$ is connected in multiple with relay $R^1$ in such direction that the unit will conduct current from rail $1^a$ to rail 1 but will not conduct current in the opposite direction. When the lower rail $1^a$ is positive, polar contact 11 will be reversed, whereupon unit $U^2$ will be connected in multiple with relay $R^1$ in such direction that this unit will conduct current from rail 1 to rail $1^a$ but not in the opposite direction.

The apparatus shown in Fig. 4 is the same as that shown in Fig. 3, except that a neutral contact 13 of relay $R^1$ is introduced into the shunt paths which include the asymmetric units $U^1$ and $U^2$. If the neutral contact 13 is not used, then when energy is applied to the relay one of the asymmetric units may form a low resistance shunt across the relay to keep the polar contacts in one position regardless of the polarity of the current supplied to the relay. By including the neutral contact 13 in the circuits for the asymmetric units, the polar contact 11 is always operated to its proper position before the shunt is closed, and so this neutral contact insures the proper operation of the relay upon reversal of the polarity of the direct current supplied to the relay.

Although I have herein shown and described only a few forms of apparatus embodying my invention, it is understood that various changes and modifications may be made therein within the scope of the appended claims without departing from the spirit and scope of my invention.

Having thus described my invention what I claim is:

1. In combination with the rails of a railway track, a source of direct current and a relay connected with said rails, means for periodically applying alternating train governing current to said rails, and an asymmetric unit connected in multiple with said relay in such direction as not to conduct current from said direct current source.

2. In combination with the rails of a railway track, a source of direct current and a relay connected with said rails, means for periodically applying alternating train governing current to said rails, and an asymmetric unit connected in multiple with said relay in such direction that the unit conducts the surges of current due to said train governing current which would tend to de-energize the relay.

3. In combination with the rails of a railway track, a source of direct current and a relay connected with said rails, means for periodically applying alternating train governing current to said rails and an asymmetric unit connected in multiple with said relay in such direction that the unit shunts away from the relay the half waves of the surges due to said train governing current which are opposite in polarity to the direct current supplied to the relay from said source.

4. In combination with the rails of a railway track, a source of direct current reversibly connected with said rails, a relay connected with said rails and responsive to reversals of said direct current source, means for periodically applying alternating train governing current to said rails, an asymmetric unit, and means controlled by said relay for connecting said unit in multiple with the relay in such direction that the unit shunts away from the relay the half waves of the surges due to said train governing current which are opposite in polarity to the direct current supplied to the relay from said source.

5. In combination with the rails of a railway track, a source of direct current reversibly connected with said rails, a relay connected with said rails and responsive to reversals of said direct current source, means for periodically applying alternating train governing current to said rails, two asymmetric units, and means controlled by said relay for connecting one of said units or the other in multiple with the relay according as the relay is energized in one direction or the other, the connection of each unit being in such direction that the unit shunts away from the relay the half waves of the surges due to said train governing current which are opposite in polarity to the direct current supplied to the relay from said source.

6. In combination with the rails of a railway track, a source of direct current reversibly connected with said rails, a relay connected with said rails and responsive to reversals of said direct current source, means for periodically applying alternating train governing current to said rails, two asymmetric units, and means controlled jointly by a neutral contact and a polar contact of said relay for connecting one of said units or the other in multiple with the relay according as the relay is energized in one direction or the other, the connection of each unit being in such direction that the unit shunts away from the relay the half waves of the surges due to said train governing current which are opposite in polarity to the direct current supplied to the relay from said source.

7. In combination with the rails of a railway track, a source of direct current reversibly connected with said rails, a relay connected with said rails and responsive to reversals of said direct current source, means for periodically applying alternating train governing current to said rails, and asymmetric conducting means controlled by a neutral and a polar contact of said relay and connected in multiple with the relay in such direction as to shunt away from the relay the half waves of the surges due to said train governing current which are opposite in polarity to the direct current supplied to the relay from said source.

8. In combination with the rails of a railway track, a source of direct current and a source of alternating current connected with said rails, a direct current relay connected with said rails and responsive to current from said direct current source, and an asymmetric unit connected with said rails in multiple with said relay.

9. In combination with the rails of a railway track, a direct current relay connected with said rails, means for applying direct current and alternating current to said rails, and an asymmetric unit connected in multiple with said relay.

In testimony whereof I affix my signature.

SAMUEL M. LUCAS.